US012450659B2

(12) United States Patent
Farnstrom

(10) Patent No.: US 12,450,659 B2
(45) Date of Patent: *Oct. 21, 2025

(54) RISK MITIGATION IN AN ELECTRONIC TRADING SYSTEM

(71) Applicant: NYSE Group, Inc., New York, NY (US)

(72) Inventor: Amy Joy Farnstrom, Oakland, CA (US)

(73) Assignee: NYSE Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,792

(22) Filed: Jun. 20, 2024

(65) Prior Publication Data

US 2024/0338764 A1    Oct. 10, 2024

Related U.S. Application Data

(60) Continuation of application No. 18/480,822, filed on Oct. 4, 2023, now Pat. No. 12,045,889, which is a continuation of application No. 17/716,197, filed on Apr. 8, 2022, now Pat. No. 11,830,073, which is a continuation of application No. 16/191,491, filed on
(Continued)

(51) Int. Cl.
*G06Q 40/00* (2023.01)
*G06Q 40/04* (2012.01)

(52) U.S. Cl.
CPC .................. *G06Q 40/04* (2013.01)

(58) Field of Classification Search
CPC ....................................... G06Q 40/04
See application file for complete search history.

(56) References Cited

U.S. PATENT DOCUMENTS 5,875,342 A    2/1999  Temple
6,516,056 B1   2/2003  Justice et al.
(Continued)

FOREIGN PATENT DOCUMENTS

CA    2750302 A1 *   2/2012  ............. G06Q 40/04

OTHER PUBLICATIONS

Kose et al: "Thresholds in the process of international financial integration" Journal of International Money and Finance, vol. 30, Issue 1, Feb. 2011, pp. 147-179 (Year: 2011).*
(Continued)

*Primary Examiner* — Edward J Baird
(74) *Attorney, Agent, or Firm* — DLA Piper LLP (US)

(57) ABSTRACT

An electronic trading system (ETS) implements risk mitigation methods for orders and quotes associated with a market participant on the ETS. The methods determine a measure of risk associated with one or more trading positions. One of the methods globally counts the number of breaches of risk thresholds associated with a trading symbol and market participant across all matching engines on the ETS over a rolling time period, and if this global risk counter exceeds a maximum, disables all further trades by the market participant on the ETS. Another method limits the number of automatic re-enablements that a market participant can request in response to prior breaches of risk thresholds that resulted in disabling any further trading by the market participant on the ETS.

16 Claims, 4 Drawing Sheets

Related U.S. Application Data

Nov. 15, 2018, now Pat. No. 11,321,778, which is a continuation of application No. 14/683,256, filed on Apr. 10, 2015, now Pat. No. 10,152,750, which is a division of application No. 14/570,778, filed on Dec. 15, 2014, now Pat. No. 10,002,388.

(60) Provisional application No. 61/922,762, filed on Dec. 31, 2013.

(56) References Cited

U.S. PATENT DOCUMENTS

| | | | | |
|---|---|---|---|---|
| 7,440,917 | B2* | 10/2008 | Farrell | G06Q 30/0283 705/37 |
| 7,774,276 | B1 | 8/2010 | Leonardo et al. | |
| 7,827,089 | B2 | 11/2010 | Sweeting et al. | |
| 7,987,135 | B2 | 7/2011 | Callaway et al. | |
| 8,112,347 | B2* | 2/2012 | Farrell | G06Q 40/04 705/37 |
| 8,296,221 | B1 | 10/2012 | Waelbroeck et al. | |
| 8,626,651 | B2 | 1/2014 | Lin et al. | |
| 8,660,936 | B1 | 2/2014 | Banke et al. | |
| 8,839,435 | B1 | 9/2014 | King | |
| 9,727,916 | B1* | 8/2017 | Montesano | G06Q 40/08 |
| 2002/0082967 | A1 | 6/2002 | Kaminsky et al. | |
| 2004/0024713 | A1* | 2/2004 | Moore | G06Q 40/04 705/75 |
| 2004/0064351 | A1 | 4/2004 | Mikurak | |
| 2004/0193532 | A1 | 9/2004 | Lawrence | |
| 2004/0210511 | A1 | 10/2004 | Waelbroeck et al. | |
| 2006/0235786 | A1* | 10/2006 | DiSalvo | G06Q 40/04 705/37 |
| 2007/0233585 | A1* | 10/2007 | Ben Simon | G07F 17/3244 705/35 |
| 2008/0179394 | A1 | 7/2008 | Dixon et al. | |
| 2008/0243672 | A1 | 10/2008 | Driscoll et al. | |
| 2009/0234776 | A1 | 9/2009 | Bauerschmidt et al. | |
| 2010/0010937 | A1 | 1/2010 | Rosenthal | |
| 2010/0138334 | A1* | 6/2010 | Warsaw | G06Q 40/04 705/37 |
| 2011/0040669 | A1 | 2/2011 | Lee et al. | |
| 2011/0119171 | A1* | 5/2011 | Abrams | G06Q 40/04 705/37 |
| 2011/0125672 | A1* | 5/2011 | Rosenthal | G06Q 40/08 705/36 R |
| 2011/0161220 | A1 | 6/2011 | Cole et al. | |
| 2011/0225081 | A1* | 9/2011 | Kittelsen | G06Q 40/04 705/37 |
| 2011/0225093 | A1 | 9/2011 | Cahn | |
| 2011/0238555 | A1 | 9/2011 | Rosenthal | |
| 2012/0166327 | A1* | 6/2012 | Amicangioli | G06F 11/0709 705/37 |
| 2012/0284158 | A1 | 11/2012 | Kovac | |
| 2013/0085917 | A1 | 4/2013 | Agarwal et al. | |
| 2013/0262283 | A1 | 10/2013 | Rooney | |
| 2014/0006243 | A1 | 1/2014 | Boudreault et al. | |
| 2014/0359638 | A1* | 12/2014 | de Lima | G06F 9/546 719/313 |
| 2015/0058219 | A1* | 2/2015 | Grossman | G06Q 20/405 705/44 |
| 2015/0121153 | A1 | 4/2015 | Goutam | |
| 2015/0127509 | A1 | 5/2015 | Studnitzer et al. | |

OTHER PUBLICATIONS

Ding: "The Legal Picture in Electronic Trading: [2* Edition]" New Straits Times; Kuala Lumpur [Kuala Lumpur], Aug. 4, 1999 (Year: 1999).

Canadian Official Action dated Jan. 21, 2021, of counterpart Canadian Application No. 2,930,438.

Göller et al: "Breach Remedies Including Hybrid Investments," Governance and Efficiency of Economics Systems, GESY, Discussion Paper 282, Oct. 2009.

Kose, et al: "Thresholds in the Process of International Financial Integration," Journal of International Money and Finance, vol. 30, Issue 1, Feb. 2011, pp. 147-179.

Marimoutou et al: "Extreme Value Theory and Value at Risk: Application to Oil Market," Energy Economics 31, 2009, pp. 519-530.

* cited by examiner

RISK MITIGATION IN AN ELECTRONIC TRADING SYSTEM

FIELD OF ART

The disclosure generally relates to the field of electronic trading systems, and in particular, to calculating and mitigating risk for traders participating in the electronic trading system.

BACKGROUND

Under certain circumstances, market makers and/or other market participants may decide to place a large volume of quotes (e.g., bids and asks), some of which may have wide bid-offer spreads, with an electronic exchange based on then-current activity and/or conditions of a given financial market. However, if the market conditions or trading activity suddenly changes or changes dramatically, the market makers and/or market participants may be exposed to financial risk. For example, a market maker's positions may be prone to excessive executions due to unusual rapid trading activity. There is therefore a need for systems, methods and apparatus capable of mitigating such risks.

SUMMARY

A electronic trading system (ETS), method and computer readable storage medium for mitigating trading risks of a market participant on the ETS are disclosed. The ETS receives and executes orders and quotes from market participants including agency brokers, market makers, and proprietary traders. An order and/or quote may include, but is not limited to, a financial instrument, a quantity, a trade symbol, an identity of a market participant and side of the order and/or quote (e.g., buy or sell). Examples of financial instruments include cash instruments, e.g., stock and other security interest, and derivative instruments that are based on one or more underlying entities or assets, e.g., options, futures, forwards, and swaps, and the like.

In one embodiment, a method (and system) comprises the step of receiving at the ETS a message associated with the market participant, wherein the message indicates a breach of trading risk threshold for a trading symbol. The method then determines whether a timestamp associated with the received message is within a rolling time period, and if so increments a global risk counter. Next, upon determining whether the global risk counter exceeds a global risk threshold, the method globally disables execution of any further trades associated with the market participant on the ETS in case the global risk counter exceeds the global risk threshold.

Another embodiment of a risk mitigating method (and system) comprises the step of receiving at an order or quote associated with a trading symbol and market participant, The method then determines whether the order or quote breaches a single-trade risk threshold, and if so determines whether any other orders or quotes executed within a rolling time period prior to the received order or quote breach a secondary risk threshold. In case of either the order or quote breaching a single-trade risk threshold or the count of secondary risk threshold breaches exceeding a maximum, execution of any further trades associated with the trading symbol and the market participant on the ETS are disabled.

In some embodiments, a risk mitigation manager calculates the risk associated with one or more trading positions and/or executed trades associated with a market participant. Based on the risk associated with one or more trading positions associated with a market participant, the ETS pulls or cancels one or more unexecuted orders or quotes associated with the market participant. In one embodiment, the ETS determines a measure of risk associated with an order or quote received from a market participant.

Yet another embodiment of risk mitigating method (and system) comprises limiting the number of automatic re-enablements that a market participant can request in response to prior breaches of risk thresholds that resulted in disabling any further trading by the market participant on the ETS.

The features and advantages described in the specification are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

Figure 1:
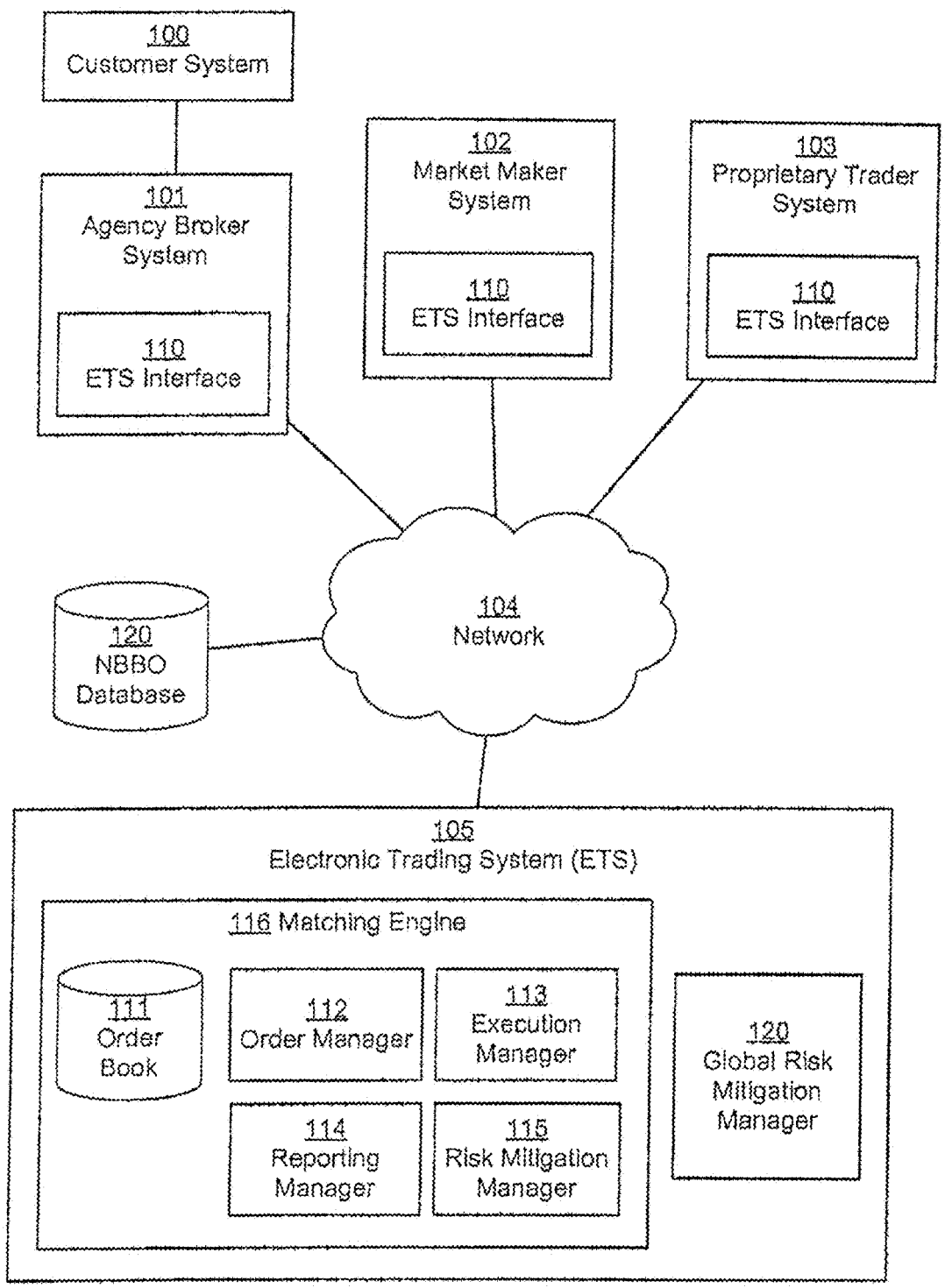
FIG. 1 illustrates a block diagram of a system architecture diagram of an electronic trading system (ETS) in a networked environment, consistent with one embodiment.

The figures and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

Overview

An electronic trading system (ETS) according to the present disclosure provides a central marketplace where both buyers and sellers (often referred to as traders or market participants) can buy or sell financial instruments. Traders may connect to the ETS via their own trading computers, which can receive market data from the ETS, and which can issue commands to buy or sell specific financial instruments. The issuance of commands to buy or sell financial instruments from a trading computer to the ETS may be referred to as electronic trading (or trading, for short). Because the ETSs facilitate the exchange of various financial instruments, the ETSs may be referred to as electronic exchanges.

When a market participant issues an order to an ETS to sell a financial instrument, the ETS may attempt to match the sell order with an existing buy order that has a price that satisfies the seller's price requirements. Similarly, when a market participant issues an order to buy a financial instrument, the ETS may attempt to match the buy order with an existing sell order. A market participant may enter a market order that is an order having no price at which to trade, so it may be executed at whatever price is currently prevailing in the market.

An ETS according to this disclosure may support limit orders in addition to market orders. A limit order is an order to buy or sell a set quantity of financial instruments at a pre-determined price or better. If a market participant issues a limit order that meets the limit order's price requirements, the limit order may be referred to as a marketable order and it may execute against a counterparty order. If a market participant issues a limit order that cannot be matched to a counterparty order meeting the limit order's price requirements, then the limit order may be referred to as a non-marketable order.

Even more so, an ETS according to this disclosure may support stop orders, which specify an activation price and a set quantity of financial instruments to buy or sell. When the price reaches the activation price or "worse," the stop order becomes a market order for the set quantity of financial instruments. "Worse" denotes a lower price when selling and a higher price when buying.

Orders for particular financial instruments received by an ETS may be stored in an electronic order book. The electronic order book may store unexecuted and/or non-marketable orders until a matching order can be found to execute a trade, or until the order is cancelled. A stored order may also be referred to as resting order, since its execution is deferred until a matching order is received. Buy orders stored in the order book may be referred to as bids, and stored sell orders may be called offers. The difference between the highest bid on the order book and the lowest offer may be referred to as a best bid-offer (BBO) spread. Price information about bids and offers for equity option contracts on various electronic exchanges in the United States are tracked by an Options Price Reporting Agency that maintains a database of the best bids and offers for each tracked option called the National Best Bids and Offers (NBBO) database. The NBBO price refers to the prices of the best bid and the best offer while the NBBO spread refers to the price difference between the best bid and best offer.

Some financial instruments may trade in illiquid markets. Illiquid markets may be characterized by wide NBBO spreads and low quantities of financial instruments available at the NBBO prices. Large market orders trading in illiquid markets may receive unfavorable prices. When an ETS receives a large market order, a small part of the market order may initially execute at NBBO prices, as expected. The remainder of the order may execute against limit orders in the order book at successively worse prices until the entire quantity of the market order is filled or the order book is cleared. Portions of large trades can thus execute at substantially worse prices than the NBBO price when the large trade was submitted. Sudden and large price movements may adversely affect market participants and reduce system stability. Market participants such as market makers, for example, may provide liquidity to a financial market by simultaneously placing buy and sell orders on the same financial instrument through the ETS.

In some instances, market makers may be appointed to particular class(es) of financial instruments (symbols) to provide liquidity in those class(es). Market makers may display buy and sell quotations for a guaranteed volume to compete for other market participant orders in those classes. The price difference between the price quoted by a market maker and the price of a counter-party to a trade may be referred to as a market maker spread, representing the market maker's profit on each trade. A class of a financial instrument can have one or multiple market makers including a lead market maker.

Thus, market makers may continuously maintain two-sided quotes (bid and ask) within a predefined spread. A market in a class may be created when an appointed market maker quotes bids and offers over a period of time, thereby ensuring that there is a buyer for every sell order and a seller for every buy order at any time. Thus, market makers (and/or other market participants) may place large volume quotes and/or quotes which may have wide bid-offer spreads with an electronic exchange based on then-current activity and/or conditions of a given financial market. However, if the market conditions or trading activity suddenly changes or changes dramatically, the market makers and/or other market participants may be exposed to financial/trading risks. For example, a market maker's positions may be prone to excessive executions due to unusual rapid trading activity. The systems, methods and apparatus described herein provide means for mitigating such risks, as further discussed below.

An exemplary system, method and computer readable storage medium according to the present disclosure may be configured to provide risk mitigation for market participants in an electronic trading system (ETS). It is noted that the systems and methods described herein are applicable to any and all market participants, including (without limitation) traders, brokers, brokerage firms, market makers, etc., such that the systems, methods and embodiments described herein shall be construed as being applicable for mitigating risk for any and all such entities.

An exemplary system may initiate, at a computing system, risk mitigation (RM) upon the occurrence of trading events that are indicative of an increased risk for market participants. Risk mitigation may be instituted on a symbol level, e.g., financial instruments belonging to a particular class, on a global level, or otherwise. In one embodiment, the system determines if risk mitigation has been initiated for a market participant, and if it has, pulls all outstanding and resting quotes of the market participant, preventing further execution of those quotes on the ETS. In another embodiment the system alerts the market participant of a breach of risk threshold on a symbol level, when a risk parameter associated with a symbol exceeds a prior-set risk threshold.

In one embodiment, a RM method comprises mitigating the risk associated with a market participant's trading positions by pulling or cancelling one or more quotes, orders or open positions associated with a market participant, such that the pulled quotes or orders may no longer be executed. In another embodiment, an RM method comprises mitigating the risk associated with a market participant's trading positions by freezing or putting on hold one or more quotes, orders or open positions associated with a market participant, such that the frozen quotes or orders may no longer be executed for a period of time or unless specified by the market participant. Alternatively, the RM method comprises notifying or alerting the market participant of the risk associated with the market participant's trading positions. In addition, the ETS may no longer accept market participant quotes or orders associated with the trade symbol. In one embodiment, the ETS may allow a new quote or order to be placed by a market participant, with respect to a trade symbol associated with one or more orders that have been pulled, on the receipt of a re-enable request from the market participant.

In one example embodiment, the RM method determines if the measure of risk associated with a particular quote or order is greater than a threshold value. The threshold value represents a level of risk to which the market participant is willing to expose the quote or order. The threshold may be specified by the market participant, the ETS or another entity. In one embodiment, the threshold may be assigned to an individual quote or order, a group of quotes or orders, or quotes and orders associated with a trading symbol and market participant. A RM method comprises comparing the determined measure of risk with the threshold. Based on the comparison a RM method can determine whether to mitigate that risk or to continue evaluating the risk associated with other quotes or orders associated with the same trading symbol and market participant.

In one embodiment, a RM method comprises global risk mitigation that takes into account all outstanding quotes of a particular market participant. In this embodiment, risk mitigation manager(s) may monitor breaches of risk thresholds at the symbol level, for example, for all classes that a market participant trades in and report those breaches to a global risk mitigation (GRM) manager. Once the number of breaches exceeds a global threshold over a rolling time period, the GRM may suspend and/or cancel all (or a portion of) outstanding and resting quotes across all (or a portion of) classes of the market participant. In this embodiment, the market participant may then send out a re-enable request to or call the global trading desk before it can submit any new quotes for any class to the ETS, since the GRM manager may also disable an automatic re-enable mechanism.

A given rolling time period may be a value specified by the market participant, the ETS, or other entity. The rolling time period may be dynamic and may change in value based on market conditions, attributes associated with RM method used to evaluate the trading risks, or other conditions outlined by the market participant, the ETS or other entity.

In another embodiment, the RM manager (or other entity) may register and count the total number of automatic re-enables issued by a market participant upon a RM triggering event on the symbol level, for example, instead of the number of RM triggers during a rolling time period. The automatic re-enable mechanism allows the market participant to continuously re-enable quotes for a symbol, e.g., allowing subsequent quote submissions, even if the capability of quoting has been temporarily disabled for the market participant in view of a risk threshold breach. A timestamp may be associated with each RM triggering event in a class that causes the RM manager to suspend and/or cancel a market participant's quotes in that class. This prevents a possible runaway condition of which a market participant is unaware while trading in that particular class. In this embodiment, once the total automatic re-enablement number exceeds a separate threshold value, the RM manager may require the market participant to contact the trade desk for the trade desk to enable the market participant to quote again for that class. The market participant may also take other actions to enable quotes again. An overall threshold value prevents a runaway condition, which could occur when the RM mechanism is continuously triggered but the trigger count does not exceed the allowed number of automatic re-enable request over the rolling time period.

Exemplary System Architecture

Turning now to FIG. 1, illustrated is a system architecture diagram of one example embodiment of an electronic trading system (ETS) in a networked environment using risk mitigation methods according to this disclosure. The ETS 105 is an electronic exchange including one or more matching engines 116 that matches orders and quotes received from market participant systems 100-103 against each other. Various market participant systems 100-103 may include but are not limited to one or more customer systems 100, agency broker systems 101, market maker systems 102, and proprietary trader systems 103. The market participant systems are coupled to the ETS 105 through at least one of a wired or wireless network 104. The ETS 105 may receive orders specifying a financial instrument, a quantity, and a side. For instance, the ETS 105 can match an order to sell a particular financial instrument from an agency broker system 101 against a different order to buy the same financial instrument from a market maker system 102, based on compatibility between the price (or other) criteria of the two orders. The ETS 105 may also communicate with the optional NBBO database 120 through the network 104. Although only a single one of each type of market participant system 100-103 is illustrated in FIG. 1, the environment may include any number of each in practice.

The customer systems 100 may include systems operated by customer/traders that can issue electronic orders to buy or sell financial instruments in accordance with the needs of those customers. The customer systems 100 may communicate the electronic orders to the agency broker systems 101, either directly or through the network 104. The customer systems 100 may be personal computers, laptops, smart phones, tablet computers, computer servers, or any other system or device capable of issuing electronic communication. The agency broker systems 101 may be operated by agency brokers and be configured to receive electronic orders from a plurality of customer systems 100. The agency broker systems 101 may include an ETS interface 110 that enables communication with the ETS 105. The agency broker systems 101 can issue orders to buy and sell financial instruments on behalf of customers, or they may issue orders for the agency brokers' own accounts. Orders may be sent through the ETS interface 110 to the ETS 105. Confirmations of issued orders (from the ETS 105) may be received through the ETS interface 110 as well. The ETS interface 110 may provide standard electronic communications capabilities such as encryption, compression, routing, quality of service guarantees, and error correction.

The market maker systems 102 may be operated by market makers. Market makers buy and sell financial instruments with the aim to profit from the spread between bids and offers (also referred to as a quote or a market maker quote). Because market makers typically place large volume quotes and/or quotes with a wide bid-offer spread, market makers provide liquidity in a financial market. Quotes placed by market makers that have not been executed yet, such as non-marketable limit quotes, may be referred to as resting quotes, in that they may be executed when suitable conditions outlined by the quote, such as price, are met. At a given time, the market makers may simultaneously place buy and sell quotes (e.g., limit quotes) on the same financial instrument through the ETS 105. Thus, a market maker may establish many resting positions at any given time as the market maker may choose to send to the ETS 105 a number of quotes based on the activity or conditions of the market. However, the market conditions or activity may change with time, thereby exposing these positions to an element of risk. For example, a market maker's positions may be prone to excessive executions due to unusual rapid trading activity. The market maker system 102 may also include an ETS interface 110 that enables market makers to place quotes with the ETS 105 and receive pricing and transactional information from the ETS 105.

The proprietary trader systems 103 may be operated by proprietary traders (PTs) that are similar to agency brokers 101, wherein PTs place orders on behalf of themselves rather than on behalf of customers, they may engage in long, short, hedge, or arbitrage strategies and they may place orders on a side of the financial instrument. In some instances, a firm may engage in both proprietary trading and market making, so that the firm may have a trader system with characteristics of both market maker systems 102 and PT systems 103. PT systems 103 may include an ETS interface 110 that enables PTs to place orders with the ETS 105 and receive pricing and transactional information from the ETS 105.

Exemplary Electronic Trading System

In the illustrative embodiment of FIG. 1, the ETS 105 includes one or more matching engines 116 for trading in a particular trading symbol and a global risk mitigation manager 120. In turn, each matching engine 116 may include an order book 111, an order manager 112, an execution manager 113, a reporting manager 114, and a risk mitigation manger 115. The order book 111 may be a data storage module that stores orders and quotes received by the matching engine 116 from any of the market participant systems 100-103, including but not limited to one or more customer systems 100, agency broker systems 101, market maker systems 102, and proprietary trader systems 103. In the subsequent description, unless otherwise specified, an "order" refers to either a quote by a market maker or an order by any other market participant.

The orders may stored in records that specify the ordered financial instrument, the trading symbol with which the order is associated, the identity of the ordering party, the order's cancellation conditions, the order/quote placement time, the order quantity and/or any other pertinent information. A cancellation condition may indicate when an order is removed from the ETS 105 (e.g., at a specific time, when a particular market condition occurs, if the order is partially filled, only if the order is canceled). Some of this information may be omitted from the records (e.g., market orders omit an order price). The ETS 105 may provide information from the order book 111 to any of the market participant systems 100-103 on request. This information may be used by the market participants to determine the price of various financial instruments in the current market. Some information from the order book 111 may be withheld from market participants (e.g., the identity of an ordering party may be withheld).

The order manager 112 may be configured to match buy and sell orders in the order book 111 against each other to create transactions. These transactions may be matched based on price priority or any other priority criteria. Other factors, such as time priority, may be used as secondary priority parameters. For example, suppose the order book 111 has three limit orders to sell shares of ACME Company. One order is from broker X, to sell 10 shares of ACME Company at a price of at least $50 per share, received on January 1st. Another order is from broker Y, to sell 15 shares of ACME Company at a price of at least $50, received on January $2^{nd}$. The final order is from broker Z to sell 5 shares of ACME Company at a price of at least $40, received on January $3^{rd}$. Further, suppose the order book 111 receives a new limit order from agency broker W to buy 25 shares of ACME Company at a price of at most $55. The order manager 112 may match the 5 shares of broker Z's sell order against broker W's buy order first because broker Z offers the best selling price. Next the 10 shares of broker X's sell order may be executed against broker W's buy order because broker X's sell order was received prior to broker Y's sell order. Finally the remainder of broker W's buy order (5 shares) may be executed against a portion of broker Y's sell order.

The order manager 112 may match orders stored in the order book 111 until no more transactions can be completed. When the possible order matches have been exhausted, the lowest priced sell order for a given financial instrument is often priced higher than the highest priced buy order. These remaining orders may be referred to as non-marketable orders because they will not execute at prevailing prices. In some instances, the execution manager 113 may block execution of orders even though the orders' pricing criteria are met. As new orders are received by the ETS 105, the order manager 112 may attempt to match them against existing orders in the order book 111. Those orders that can be matched at prevailing prices may be referred to as marketable orders. Orders that cannot be matched against existing orders may be referred to as non-marketable orders and may be stored in the order book 111 until they are marketable. The ETS 105 may be configured to execute received market orders against a current highest-priced buy order or lowest-priced sell order stored in the order book 111. The order manager 112 may also store information regarding an executed order such as the financial instrument, order identification (ID) identifying the order, ordering party ID identifying one or more parties associated with the executed order, the price at which the order was executed, the trade symbol, the volume associated with the executed order and/or any other desired or pertinent information.

The execution manager 113 may enforce regulations and policies of the ETS 105 over the operation of the order manager 112. The execution manager 113 may ensure that the ETS 105 does not execute orders at worse prices than those reported by the NBBO database 120 (or any other pricing threshold), for example. The execution manager 113 may enforce a collar on marketable orders. The collar prevents execution of orders at prices worse than a collar price, which may be based on prevailing prices. In one embodiment, the collar restricts execution to orders having a price better than a collar price. The collar price may shift over time and/or in response to execution or routing of certain orders. The collar price may be based in part on prices reported by the NBBO database 120, local BBO prices, or recently executed transaction prices. Additionally, the execution manager 113 in combination with the risk mitigation manager 115 may enforce risk management measures designed to spot erroneous or inadvertent trades.

The reporting manager 114 may be configured to transmit information about the ETS to market participant systems 100-103 and the NBBO database 120. Transmitted information may include characteristics of executed orders (e.g., posting prices, quantity exchanged) and/or characteristics of orders in the order book 111. Transmitted information may omit some orders in accordance with exchange policies. For example, stop market orders that have not reached an activation price may be omitted. The reporting manager 114 may also transmit risk management information such as parameters of policies enforced by the execution manager 113 (e.g., collar parameters, risk alerts). Market participant systems 100-103 may display received information on their ETS interfaces 110. The reporting manager 114 may report the prices of the lowest priced sell order and highest priced buy order to the NBBO Database 120. The reporting manager 114 may include a web server, or an application programming interface (API) for communicating through the network 104.

The risk mitigation (RM) manager 115 may determine a measure of risk associated with quotes received by the order manager 112 from a market participant system 100-103. The determination of risk on a symbol level can be based on one or more risk parameters associated with the received quote, including, but not limited to, the quantity, size or volume, price, the number of transactions associated with the quote, and the class or trading symbol or the market participant (e.g., the market maker). A measure of risk represents a metric or a quantitative value associating risk with a quote and/or an executed or unexecuted trade. The RM manager 115 may then enforce a symbol-level risk mitigation mechanism if the determined measure of risk associated with a particular market (e.g., market maker) and class (symbol) exceeds a specified threshold value. Enforcement can include suspending, pulling or cancelling one or more quotes associated with a market participant and a particular class.

In one embodiment of a symbol-level risk mitigation mechanism, the RM manager 115 may determine the number of transactions associated with a market participant (e.g., market maker) and symbol over a rolling time period as a measure of risk. In another embodiment, the RM manager 115 may determine the number of contracts (volume) associated with a market participant (e.g., market maker) and symbol over a rolling time period. In yet another embodiment, the RM manager 115 may determine the aggregate of all series percentages associated with a marker participant (e.g., market maker) and symbol during a rolling time period, wherein each series percentage comprises the number of executed contracts in a series over the total quote size.

Other embodiments include any combination of the described risk measures and operations performed to determine such risk measures for a particular symbol. For example, the RM manager 115 may determine the number of transactions multiplied by the volume as a risk measure for a particular market participant (e.g., market maker) and symbol. Generally, risk mitigation may be class (symbol) specific and each RM manager 115 of a particular matching engine 116 may determine breaches of risk measures for a corresponding symbol, e.g., if the risk measure exceeds a set threshold value, but does not aggregate those breaches among multiple classes. In another embodiment, the RM manager 115 may determine the automatic re-enable commands issued by a market participant (e.g., market maker) and disables any further trades and quotations by the market participant, if the automatic re-enable number exceeds a specified threshold value. This embodiment puts an effective limit on automatic re-enablements by the market participant. Particular embodiments of symbol-level risk mitigation mechanisms are described in more detail below.

An alternative embodiment of global risk mitigation includes a global risk mitigation manager 120 that determines risk measure breaches associated with a market participant among all matching engines 116. In this embodiment, the ETS 105 can mitigate the global risk of a market participant by suspending, pulling and/or cancelling all quotes of a market participant across all matching engines 116 and all classes, and globally disabling any further quotations by the market participant. In one embodiment, global risk mitigation can be combined with limits on automatic re-enablements by a market participant. Particular embodiments of global risk mitigation mechanisms are described in more detail below.

Exemplary Computer System

Figure 2:
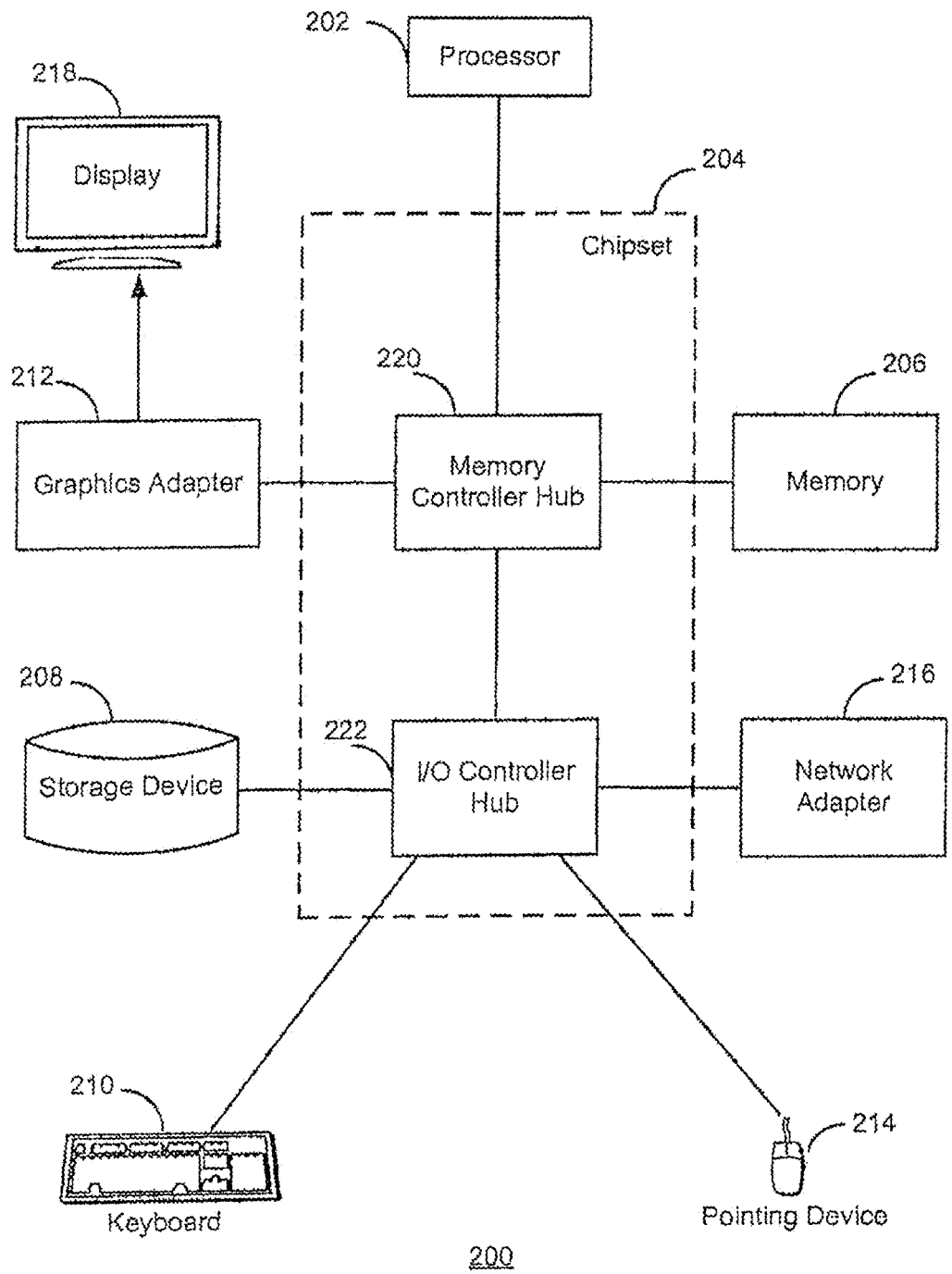
FIG. 2 illustrates a high-level block diagram of an example computer, consistent with one embodiment.

The customer system 100, the agency broker system 101, the market maker system 102, the PT system 103, and the ETS 105 are implemented using one or more computers. FIG. 2 is a high-level block diagram illustrating an example computer 200. The computer 200 includes at least one processor 202 coupled to at least one chipset 204. The chipset 204 includes an optional memory controller hub 220 and an optional input/output (I/O) controller hub 222. A memory 206 and optional graphics adapter 212 may be coupled to the memory controller hub 220, and an optional display 218 may be coupled to the graphics adapter 212. A storage device 208, keyboard 210, pointing device 214, and network adapter 216 may optionally be coupled to the I/O controller hub 222. Other embodiments of the computer 200 have different architectures.

The storage device 208 may comprise a non-transitory computer-readable storage medium such as a hard drive, compact disk read-only memory (CD-ROM), DVD, or a solid-state memory device. The memory 206 may hold instructions and data used by the processor 202. The processor 202 may include one or more processors 202 having one or more cores that execute instructions. The pointing device 214 may comprise a mouse, track ball, or other type of pointing device, and may be used in combination with a keyboard 210 (or other peripheral) to input data into the computer 200. The graphics adapter 212 displays images and other information on the display 218. The network adapter 216 couples the computer 200 to one or more computer (wireless and/or wireless) networks.

The computer 200 is adapted to execute computer program modules for providing functionality described herein. As used herein, the term "module" refers to computer program logic used to provide the specialized functionality. Thus, a module can be implemented in hardware, firmware, and/or software. In one embodiment, program modules such as the order manager 112, execution manager 113, and reporting manager 114 are stored on the storage device 208, loaded into the memory 206, and executed by the processor 202.

The types of computers 200 that may be used by the market participants and the ETS 105 of FIG. 1 can vary depending upon the embodiment and the processing power required by the entity. For example, the ETS 105 might comprise multiple blade servers working together to provide the functionality described herein. The computers 200 may contain duplicates of some components or may lack some of the components described above (e.g., a keyboard 210, a graphics adapter 212, a pointing device 214, and a display 218). For example, the ETS 105 can run in a single computer 200 or multiple computers 200 communicating with each other through a network such as in a server farm.

Symbol-Level Risk Mitigation-Triggering Events

To mitigate a market participant's risk, a matching engine 116 may monitor the market participant's transactions in a symbol that it receives from the market participant and provides risk alerts to the market participant that are triggered upon occurrence of certain events. A symbol-based trigger event may occur when the number of a designated risk parameter associated with that symbol and market participant exceeds (breaches) a threshold value during a fixed time interval called the rolling time period, e.g., 100 milliseconds. In one embodiment, the matching engine continuously determines if any symbol-based trigger events occur for any quotes that it receives. Once risk mitigation is triggered, the matching engine 116 may suspend, pull and/or cancel any remaining quotes that it receives from the market participant in that class. Subsequently, the market participant may send out a re-enable request to the matching engine 116 before submitting a new quote for the class to that engine. In another embodiment, the RM manager 115 of the matching engine 116 may track the number of automatic re-enable requests sent by the market participant to the RM manager 115 during the rolling time period, e.g., 100 milliseconds instead or in addition to the number of trigger events. The RM manager 115 may allow for a set number of automatic re-enable requests during the rolling time period before initiating risk mitigation, resulting in suspending, pulling and/or cancelling of any received and outstanding quotes of the market participant by the RM manager for the corresponding matching engine.

Various symbol-based triggers can be envisioned that would result in commencing risk mitigation. Triggering events can be based on, but are not limited to, a number of transactions, transaction volume, transaction percentage or any combination thereof. For transaction-based triggers, the RM manager 115 counts the number of transactions by a market participant, e.g., the number of market participant quotes executed over the rolling time period. An exemplary minimum and maximum number of transactions can be three or 20 trades per rolling time period, respectively, before commencing risk mitigation. In case of volume-based triggers, the RM manager may count the number of a market participant's executed contracts over the rolling time period. For example, if this number for a market participant exceeds 20 contracts in 100 milliseconds, the RM manager will commence risk mitigation measures for this market participant.

When employing a percentage-based risk parameter, the RM manager may count the number of contracts as a percent of the quote or order over the rolling time period for each series of an appointed class, in which a market participant quotes at NBBO, and then aggregates the percentages among all the series. For example, if a market participant is quoting at the NBBO in four series of an appointed class during the rolling time period as shown in Table 1 below, the aggregate executed among all series during that period equals 100% for 95 contracts. In case of the risk parameter being set at 100%, this would then trigger risk mitigation, resulting in cancellation or suspension of the market participant's remaining quotes in the appointed class that were received prior by the corresponding matching engine. In other embodiments, the threshold value of the risk parameter for initiating risk mitigation can be set in the range from 100% to 2000% for a rolling time period.

TABLE 1

| Series | Quote Size | Number of Executed Contracts | Series Percentage |
| --- | --- | --- | --- |
| Series 1 | 100 | 40 | 40% |
| Series 2 | 50 | 20 | 40% |
| Series 3 | 200 | 20 | 10% |
| Series 4 | 150 | 15 | 10% |
| Aggregate | 500 | 95 | 100% |

In one embodiment, market participants may be required, for each class in their appointments, to select at least one symbol-based risk mitigation mechanism based either a transaction-based, volume-based or percentage-based risk parameter to be applied for a particular class before being enabled to quote on the ETS and the corresponding matching engine. In one embodiment, a market participant may be limited to choosing one different risk parameter for each appointed class. For example, a market participant can choose a volume-based risk parameter for trading in one symbol, a percentage-based risk parameter for another symbol, and a transaction-based risk parameter for yet another symbol. In one embodiment, transaction-based risk parameter may be used as the default parameter for quoting and may be set to five (or any desired number of) transactions over a 100 milliseconds rolling time period. While market participants may be required to have an RM mechanism in force before being able to quote, other market participants may have to an option to enable or disable an RM mechanism of their choice.

Global Risk Mitigation

Figure 3:
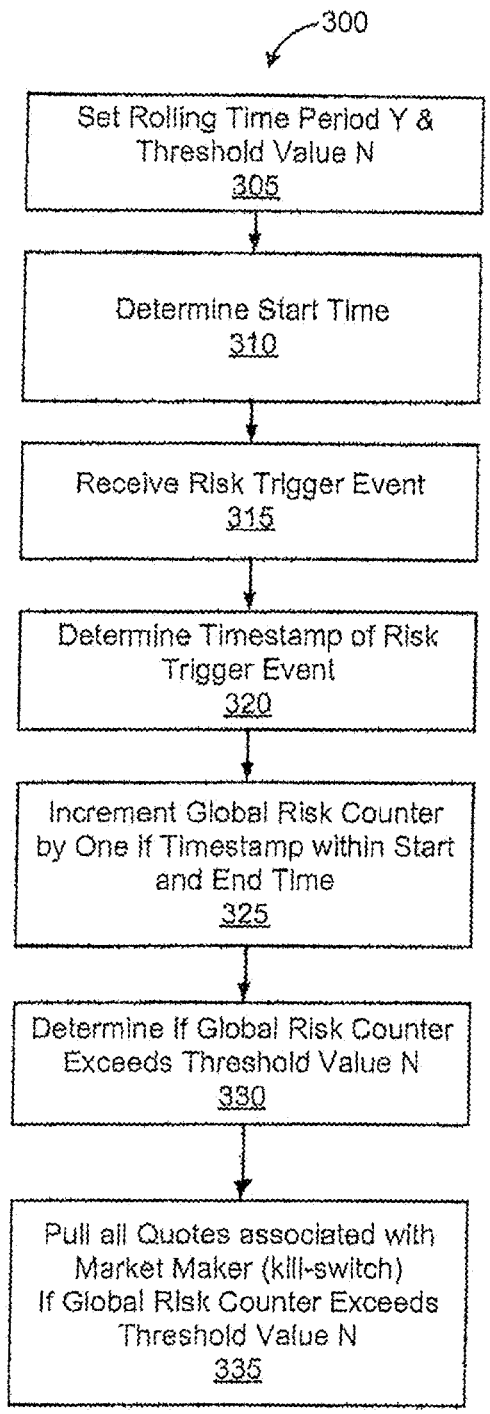
FIG. 3 shows a flowchart of a method for calculating and mitigating risk associated with market maker quotes and orders received by the electronic trading system (ETS), according to one embodiment.

FIG. 3 illustrates a method 300 for calculating and mitigating global risk associated with market participant quotes and orders received by the electronic trading system (ETS), according to one embodiment. In one embodiment, the functionality described in conjunction with FIG. 3 may be performed by a global risk mitigation (GRM) manager (e.g., GRM Manager 120 of FIG. 1); however, in other embodiments, any suitable component or combination of components may perform the functionality described in conjunction with FIG. 3. Additionally, in some embodiments, different and/or additional steps than those identified in FIG. 3 may be performed or the steps identified in FIG. 3 may be performed in different orders.

In some embodiments, the GRM manager monitors all matching engines for individual occurrences of risk mitigation at the symbol level for orders or quotes by market participants. In one embodiment, the monitored market participants may include market makers. The method 300 of this exemplary embodiment comprises setting the duration of a rolling time period Y 305. The time as measured by the RM mangers and the GRM manager may be synchronized. In addition, a maximal threshold value N of individual symbol-based RM trigger events associated with a particular market participant may be set 305. Optionally, this threshold value may be independent of the risk-parameter type, e.g., volume-based, transaction-based or percentage-based, that triggers the individual RM event on a particular matching engine.

Subsequently, a start time may be determined 310 when the global risk counter is set to zero and the market participant is globally enabled to trade in all appointed classes on all matching engines. The end time for receiving RM trigger events may comprise the start time advanced by the rolling time period. The GRM manager may then register any RM trigger event received 315 from the RM managers at the local matching engines and associated with the market participant. Upon receiving a RM trigger event 315, the GRM manager may determine the timestamp 320 included with the RM trigger event. Multiple RM trigger events can be received from a single symbol or multiple symbols. If a timestamp falls within the start time and end time, the GRM manager may increment 325 the global risk counter by one.

The GRM manager may then determine 330 if the global risk counter for a market participant exceeds the threshold value N, and if it does, a kill-switch (global RM event) may be activated 335 that pulls or cancels all quotes in all symbols associated with the market participant. The kill-switch may also globally prevent the market participant from trading/quoting in any symbol and on any matching engine. A global RM event may require the market participant to contact the global trade desk or other human intervention (or initiate an electronic request) in order to globally re-enable the market participant to trade and quote again on the ETS. Automatic re-enablement, e.g., the market participant requesting a particular matching engine to re-enable the market participant to trade on this engine, may be barred by global disablement. Once globally re-enabled, market participants will be able to trade/quote on a symbol level via an API, for example. Expiration of the rolling time period prior to activation of the kill-switch may reset the global risk counter to zero, and restart a next rolling time period.

In another embodiment involving orders of market makers, the GRM manager may set a global risk flag and resting quotes of a market maker may be instantaneously disabled based on a global RM breach. New inbound quotes by the market maker may be instantaneously rejected and disabled quotes may be pulled from all displayed markets with minimal latency. The GRM manager may store the session identification (ID) and ID of the RM manager from which the last quote causing the local RM event originated. The GRM manager may also alert the RM manager with the corresponding ID of the global RM breach and communicate the session ID to the RM manager. The symbol that instigated the breach may get a symbol-level and a global RM alert with regard to the session having the session ID. Thus, when there are multiple sessions quoting the same symbol, the alerts may only be sent to the session that submitted the last valid quote. In addition, global breach alerts may be sent for all symbols appointed to a market maker that has been actively quoted on the day of the breach.

In an alternative embodiment involving orders of other market participants, e.g., trading permit holders, the GRM manager may set a global risk flag and inbound orders may be instantaneously rejected. The GRM manager may also pull resting orders with potentially some latency, since the GRM manager might not invoke a global disablement for all orders, contrary to the disablement of quotes from market makers. Instead, the GRM manager can cancel any trades from the market participants in the GRM-causing symbol by symbol bulk order cancel, while sending out a risk mitigation confirmation after the last order in a trading unit is pulled. In one embodiment, all symbols that the market participant trades in are subject to GRM, if the market participant selects at least one symbol to participate in GRM regardless of symbol-level risk mitigation setting or use by the market participant. If GRM is breached, a symbol-level re-enablement by the market participant may be required for every symbol that has an active local RM setting. In another embodiment, if no orders have been sent by a market participant in a symbol on current day, then no symbol-level re-enablement may be required, since the market participant's trading capability is re-enabled on a global level.

In one embodiment involving orders of a market participant, e.g., trading permit holder, the GRM manager may send out a GRM breach alert to all the sessions that submitted orders for the market participant, when a GRM breach occurs involving orders by said market participant. In one embodiment, the underlying financial instrument, e.g., the stock symbol, which instigated the breach alert, may receive a stock-level breach alert instead of a GRM alert on all sessions through which orders were submitted. Delivery of GRM and stock-level breach alerts to the market participant's sessions may occur in the sequence as they have been generated by the RM managers of the matching engines for each underlying financial instrument. In the case of multiple underlying financial instruments causing breach alerts, this sequence might vary across the instruments as the alerts originate from different trading units. Once a breach alert is generated for a market participant, all orders may be cancelled on all trading units and any messages regarding order executions that occurred prior to the GRM breach alert and received on the trading unit may be delivered to the sessions on which the order have been submitted. Once the GRM breach alert is sent by the GRM manager, the sequence of executions and GRM breach may be guaranteed and no further executions may take place. In one embodiment, a GRM rejection message for new orders might be delivered prior to a GRM breach alert message with GRM alerts only being generated for symbols having active orders.

In some embodiments, updates to configurable RM threshold parameters may reset any RM counters and discard prior trading activity by a market participant for determining GRM and local RM breaches. Similarly, after a GRM breach, any change between a disabled and enabled trading status of a market participant may be reset and all RM counters may be restarted, discarding any prior trading activity by a market participant for determining GRM and local RM breaches. If a market participant receives permission to trade in a new symbol during the trading day while being globally disabled to trade, the new symbol may also be disabled despite the RM managers on the ETS accepting the permission. The new symbol may be disabled until the global risk flag is reset, e.g., by a trade desk instead of the market participant, thus enabling the market participant to trade and quote with the appropriate symbol-level RM settings.

In one embodiment, symbol-level RM is optional when GRM is employed. In another embodiment, if trading by the market participant is globally disabled and subsequently the global risk flag is reset, e.g., by the trade desk, thereby globally re-enabling trade activity by the market participant, the market participant may still be required to re-enable individual symbols at the local RM managers prior to sending orders in those symbols to those RM managers. This provides the market participants with the opportunity to reconsider individual RM settings prior to trading again on the ETS. Furthermore, the trade desk and/or the corresponding RM managers may inform the market participant of successfully re-enabling individual symbols at the local RM level.

In one embodiment, the market participant, including but not limited to trading permit holders and market makers, can select RM risk parameters and RM threshold values that are within a range determined by the ETS and operate on a local and global level. In some embodiments, if during the rolling time period (e.g., as defined by the ETS) a market participant experiences a GRM breach, all quotes and orders by the market participant may be globally pulled and any further trading in all symbols may be disabled on a global level. In addition, the market participant may also be prevented from automatically re-enabling any symbols for further trading, requiring external intervention, e.g., by the trade desk, to re-enable trading in the disabled symbols.

Timestamp Check

In one embodiment, due to a potential race conditions, delays by network retransmissions, e.g., up to 30 milliseconds, or instant crash and restarts of the GRM or other ETS managers, resulting in the GRM manager to request a replay of symbol-level RM triggering events, the method 300 may enforces time limit, e.g., 30 milliseconds, until when the occurrence of a symbol-based RM trigger may be reported by the RM manager of a matching engine to the GRM manager. Only trigger events generated within that time limit may be logged and considered in the calculation of the global risk counter by the GRM manager. In order to determine whether that time limit is exceeded, the GRM manager may compare the timestamp associated with the received trigger event and with a current clock time. If the difference between current clock time and the event's timestamp is larger than the time limit, the event may be discarded by the GRM manager without increasing the global risk counter.

Race Conditions

A race condition may comprise a situation when a symbol-based trigger event occurs at an ETS matching engine before the GRM manager was able to process all previously received trigger events. In one embodiment, a race condition can occur because the GRM manager is separated from the matching engines' RM managers that separately monitor RM events on their corresponding matching engines. In particular, symbols are continued to be traded on some matching engines as execution opportunities occur, while the RM managers of other matching engines are reporting symbol-level RM breaches to the GRM manager. A potential race condition may be described by the following sequence of events.

As described above, the GRM manager may count symbol-level breaches as reported by RM managers of the matching engines, and sum up those breaches during a rolling time period. If a global risk counter threshold is met, the GRM manager may reset the timestamp at each RM manager and the global risk flag to disable while communicating to the RM managers at the matching engines to disable any further trades/quotes by the market manager. A race condition can occur when a particular matching engine continues to execute a market participant's trades in symbols since the local symbol-level risk mitigation threshold has not been breached despite a global risk mitigation breach. Until the global breach is processed by the GRM manager and communicated to each local RM manager, a particular RM manager may continue to execute the market participant's trades even in the presence of local symbol-level RM breaches, since the market participant can still automatically re-enable these local breaches.

On the other hand, some RM manager might be disabled by the number of local breaches exceeding a local threshold value, rejecting every new quote by the market participant, before the GRM disablement becomes fully effective with all RM managers. Yet another race condition may occur after the GRM disablement became effective and subsequently trading for the market participant is enabled, but a local symbol-level RM breach occurs before the global re-enablement is fully effective.

Thus, in one embodiment, the RM managers may continuously update the GRM manager about their status prior to reaching local RM breaches and thus minimizing messages regarding symbol-based RM breaches and enable/disable alerts being asynchronous with GRM breaches and global disablement messages.

Limits on Automatic Re-Enablement

In one embodiment, an RM manager of a matching engine may invoke an automatic re-enabling mechanism that limits the number of automatic re-enablement for a symbol that can be request by a market participant before triggering a symbol-based RM event. In this embodiment, the RM manager may initially set the symbol's automatic re-enablement counter associated with a market participant to zero. Any subsequent re-enablement by market participant in response to a symbol-based RM trigger event increases the corresponding automatic re-enablement counter by one. The RM manager may then determine if the counter exceeds a previously specified threshold value, and if so, may disable any further trades by the market participant in the symbol on this matching engine. In addition, the market participant may then take additional steps, e.g., contacting the trade desk, other than just automatic re-enabling to be able to quote and trade again in this class. An overall threshold value independent of any rolling time period can prevent a possible runaway condition, which can occur when RM events are triggered, resulting in automatic re-enablements that do not exceed a threshold value during a particular rolling time period.

Alternative Symbol-Level Risk Mitigation

Figure 4:
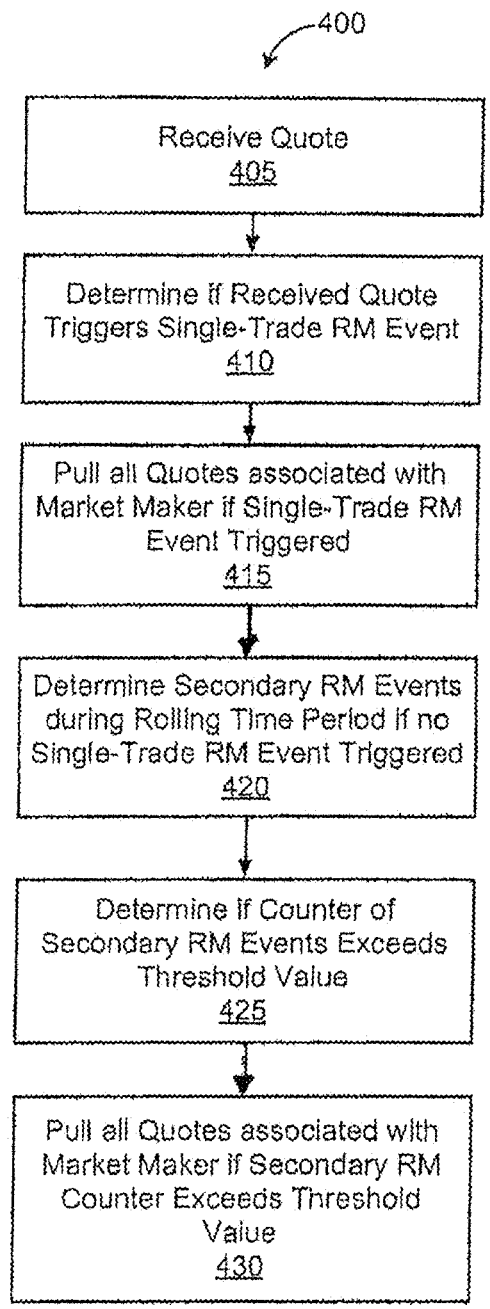
FIG. 4 shows a flowchart of a method for calculating and mitigating risk associated with market maker quotes and orders received by the electronic trading system (ETS), according to one embodiment.

FIG. 4 illustrates an exemplary method 400 for calculating and mitigating risk associated with market participant quotes and orders received by the electronic trading system (ETS), according to one embodiment. In this embodiment, the functionality described in conjunction with FIG. 4 may be performed by the RM manager 115 of FIG. 1, for example; however, in other embodiments, any suitable component or combination of components may perform the functionality described in conjunction with FIG. 4. Additionally, in some embodiments, different and/or additional steps than those identified in FIG. 4 may be performed or the steps identified in FIG. 4 may be performed in different orders.

In some embodiments, an RM manager may receive a quote 405 associated with a trading symbol from a market participant. Alternatively, the RM manager may receive a non-marketable quote 405 from the order book associated with the market participant. Upon receiving the quote 405, the RM manager may initially determine if the quote triggers a single-trade RM event 410. The single-trade RM trigger parameter can be based on any of the above described symbol-based RM triggers, e.g., transaction-based, volume-based or percentage-based risk parameters. In case the single-trade RM event is triggered by the parameter exceeding a single-trade RM threshold value, the RM manager 415 may suspend, pull and/or cancel all of the market participant's quotes for the same symbol on the corresponding matching engine. Any subsequently received quote from the market participant may then be rejected, unless the market participant re-enables quoting for this symbol with the RM manager using one of the mechanisms described above.

The RM manager may also determine any secondary RM events 420, if the original quote does not trigger any single-trade RM breach. In this case, the RM manager may evaluates all quotes associated with the same trading symbol and market participant that have been executed during a predetermined time rolling period just prior to the execution of original quote. Starting with most recently executed quote, the RM manager may determine if a quote triggers a secondary RM event. The secondary RM trigger parameter can be based on any of the above described symbol-based RM triggers, e.g., transaction-based, volume-based or percentage-based risk parameters. In case the secondary RM event is triggered by the parameter exceeding a secondary RM threshold value, a secondary RM counter may be incremented by one. Once the RM manager 425 determines that the secondary RM counter exceeds a predetermined threshold, the RM manager may initiate any one of the above described risk mitigation measures, e.g., 430 suspending, pulling and/or cancellation of all quotes associated with the same trading symbol and market participant. In case the secondary RM counter does not exceed the threshold after evaluating all quotes executed during the prior rolling time period, the RM may reset the counter without taking any risk mitigation measures and continue by evaluating the next incoming and executed quote for a single-trade RM breach. In an alternative embodiment, the RM manager may be forward looking in time over a rolling time period instead of evaluating recently executed quotes over the same time period.

For example, an RM manager may obtain an initial market participant quote and determine the risk associated with that quote at time=zero. If the single-trade RM trigger parameter is breached, the RM manager pulls all quotes associated with the market participant. In this example, the single trade RM trigger is a percentage-based threshold of 100% set prior the obtaining the initial quote. Since only 25% of the first quote of 20 contracts of XYZ January 40 puts is filled, falling below the 100% threshold limit, no single-trade RM event is triggered. In addition, the RM manager determines if the quote triggers a secondary RM breach. In this example, the secondary RM breach is also determined using the percentage-based risk parameter of the quote and comparing it to a second RM threshold of 50%. Initially, the secondary RM counter is set to zero. Again, with only 25% of the XYZ January 40 puts initial quote executed, thus falling below the threshold of 50%, no secondary RM breach is recorded by the RM manage.

TABLE 2

| Time/milliseconds | Quote | Quote Size | Number of Executed Contracts | Percentage | Secondary RM Counter |
|---|---|---|---|---|---|
| 0 | XYZ Jan. 40 puts | 20 | 5 | 25% | 0 |
| −10 | XYZ Jan. 40 puts | 20 | 12 | 60% | 1 |
| −20 | XYZ Mar. 20 calls | 20 | 8 | 40% | 1 |
| −30 | XYZ May 35 calls | 20 | 14 | 70% | 2 |
| −40 | XYZ Jan. 50 calls | 20 | 10 | 50% | 3 |

Accordingly, the RM managers then evaluates all prior received quotes over the rolling time period of 100 milliseconds for a single-trade RM trigger and secondary RM trigger events. In its example, the RM manager evaluates the most recent quotes before any earlier received quotes. In the example shown in Table 2 above, none of the quotes previously received by the RM manager trigger a single-trade RM event, since all the quote fall below the 100% threshold by having filled percentages of 60%, 40%, 70%, and 50%, respectively. However, quotes at −10, −30 and −40 milliseconds, each involving 20 contracts of XYZ January 40 puts, XYZ May 35 calls and XYZ January 50 calls, respectively, exceed and/or equal the secondary RM threshold of 50%, namely 60%, 70% and 50%, respectively. Thus, each of these quotes triggers a secondary RM breach and increment the secondary RM counter by one.

Once the secondary RM counter exceeds a secondary RM threshold value, the RM managers initiates risk mitigation by suspending, pulling and/or cancelling quotes associated with the symbol and the market participant on the corresponding matching engine. In this example, a secondary RM threshold value of two would result in risk mitigation, since the RM manager advances the secondary RM counter to three when evaluating the quote at the time of −40 milliseconds. As the count is greater than the threshold value of two, the RM manager may suspend, pull and/or cancel the quote and quotes associated with the market participant, trade symbol and financial instrument as determined from attributes of the evaluated quote.

The described embodiments discuss an implementation that determines trading risk measures by modifying, adding, and/or subtracting parameters from other quantities in the ETS, such that the risk measure may be used to mitigate risks for market participants trading on the ETS. Modifying may include operations such as one or more of multiplication, division, percentages, exponentiation, differentiation, integration, or any non-linear functions. Alternate embodiments may modify these quantities or other risk parameters using random or pseudo-random numbers without departing from the disclosed subject matter.

Some portions of above description describe the embodiments in terms of algorithms and symbolic representations of operations on information. These algorithmic descriptions and representations may be used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification arc not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for mitigating risk of a market participant on an electronic trading system. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

The invention claimed is:

1. A system comprising:
   one or more processors of an electronic trading system ("ETS") operatively coupled to a non-transitory memory storing computer readable instructions that, when executed by the one or more processors, cause the one or more processors to:
   receive, by an interface of the ETS, a plurality of trade instruction messages from a plurality of user devices via a network, the plurality of trade instruction messages associated with a plurality of trading symbols;
   store, by at least one matching engine, the plurality of trade instruction messages in an order book;
   continuously monitor, by at least one risk mitigation ("RM") module, the plurality of trade instruction messages;
   identify, by the at least one RM module based on the continuously monitoring, a trade instruction message of the plurality of trade instruction messages associated with a trading symbol of the plurality of trading symbols and a user having a trading status that is enabled;
   determine, by the at least one RM module, that one or more first parameters associated with the trading symbol in the trade instruction message are below a first threshold associated with a first triggering event;
   retrieve, by the at least one RM module, based on the determination that the one or more first parameters associated with the trading symbol in the trade instruction message are below the first threshold, stored trades associated with the trading symbol and the user from an order manager, the stored trades executed within a rolling time period prior to receipt of the trade instruction message;
   determine, by the at least one RM module, an occurrence of a second triggering event based on one or more second parameters associated with the trading symbol in a predetermined number of the stored trades executed within the rolling time period breach a second threshold;
   disable, by the at least one RM module, the trading status of the user, thereby prohibiting the user from issuing new trade instruction messages; and
   cancel, by the at least one matching engine, execution of any further trades associated with the trading symbol and the user.

2. The system of claim 1, wherein the at least one matching engine is configured to send the plurality of trade instruction messages to the at least one RM module.

3. The system of claim 2, wherein, responsive to the cancel the execution of any further trades, the at least one matching engine is configured to:
   reject all outstanding orders associated with the user; and
   cancel execution of any pending transactions associated with the user.

4. The system of claim 1, wherein the user comprises at least one of an agency broker, a market maker, and a proprietary trader.

5. The system of claim 1, wherein the predetermined number of the stored trades is determined by at least one counter.

6. The system of claim 5, wherein the at least one RM module is configured to activate the at least one counter upon a determination that the one or more first parameters of the trade instruction message do not breach the first threshold.

7. The system of claim 1, wherein the one or more first parameters comprise one or more of a predetermined number of transactions, a predetermined volume, and a predetermined aggregate percentage.

8. The system of claim 7, wherein the one or more first parameters are specific to the user and the trading symbol.

9. The system of claim 1, wherein the one or more second parameters comprise one or more of a predetermined transaction parameter, a predetermined volume parameter, and a predetermined percentage parameter.

10. The system of claim 1, wherein each of the plurality of trade instruction messages comprises one or more orders or quotes associated with the trading symbol and the user.

11. The system of claim 1, wherein the at least one RM module is configured to disable the trading status of the user for a predetermined period of time.

12. The system of claim 1, wherein the at least one RM module is configured to re-enable the trading status of the user responsive to at least one re-enablement request from the user.

13. The system of claim 12, further comprising:
   tracking, by the at least one RM module, a number of re-enablement requests relative to a predetermined threshold.

14. The system of claim 13, wherein the re-enable the trading status further comprises re-enabling the trading status of the user when the number of re-enablement requests is less than the predetermined threshold.

15. The system of claim 1, wherein the at least one RM module is configured to re-enable the trading status of the user responsive to a risk-reset event.

16. The system of claim 1, wherein the at least one RM module is further configured to:
 generate an alert indicating the disable the trading status of the user; and
 transmit the alert to a user device of the user.

\* \* \* \* \*